United States Patent Office

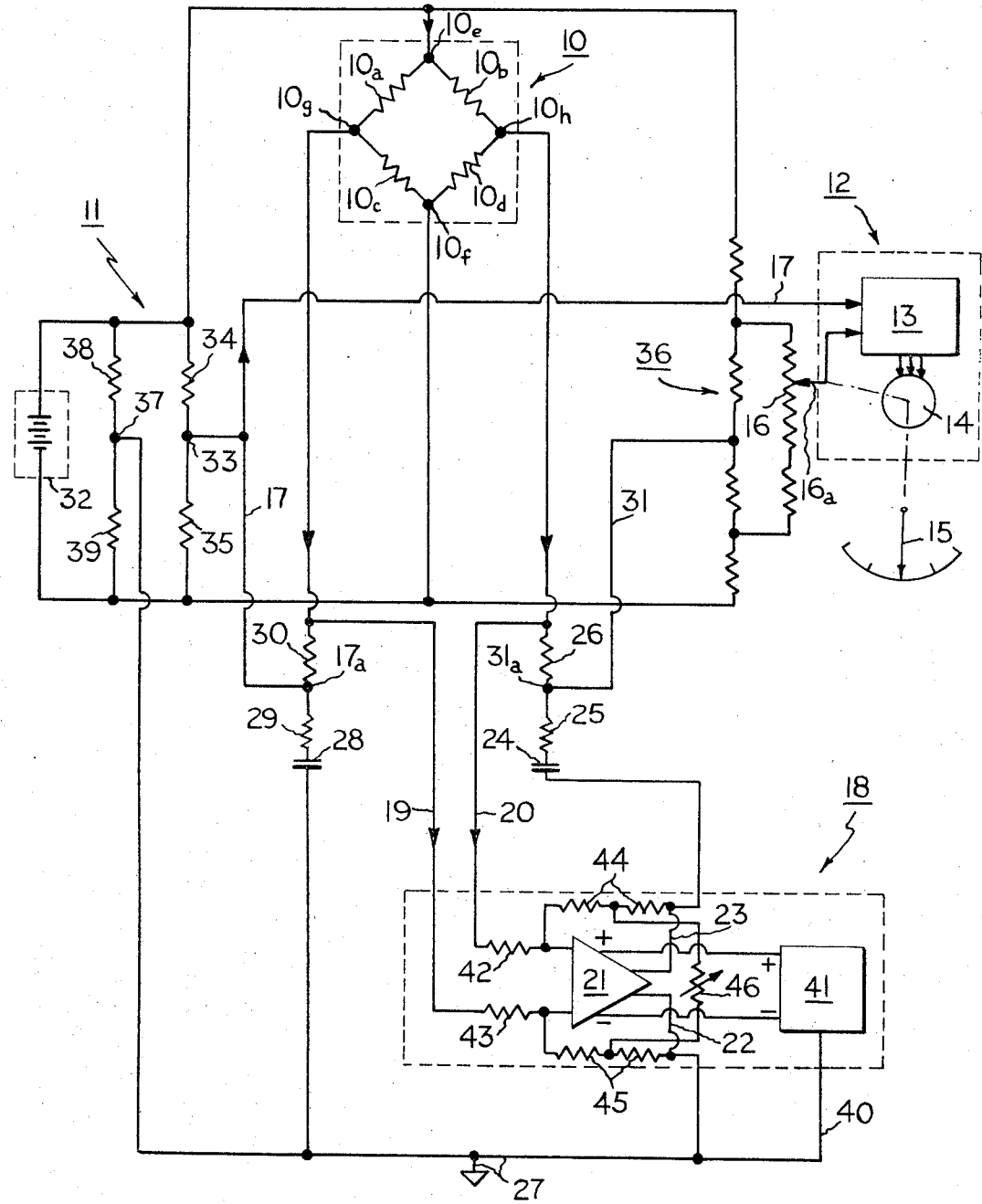

3,434,343
Patented Mar. 25, 1969

3,434,343
LOW FREQUENCY DAMPING CIRCUIT FOR STRAIN GAGE TRANSDUCERS
Donald A. Senour, Carlisle, Mass., assignor to BLH Electronics, Inc., Waltham, Mass., a corporation of Delaware
Filed Apr. 3, 1967, Ser. No. 628,071
Int. Cl. G01l 5/12
U.S. Cl. 73—141     4 Claims

ABSTRACT OF THE DISCLOSURE

An electrical strain gage transducer measuring circuit is rendered substantially immune to disturbances of unwanted dynamic loadings and spurious electrical signals by action of an operational amplifier which automatically introduces out-of-phase signals cancelling and eliminating responses to undesirable A-C voltages.

Background of the invention

The present invention relates to improvements in measurement apparatus wherein only the static component of mixed static and dynamic effects is to be characterized, and, in one particular aspect, to novel and improved electrical strain gage transducer systems which are inexpensive to construct and install, and which operate with a high degree of accuracy despite the presence of spurious unpredictable A-C electrical signals resulting from untoward effects such as those of electrical interference and of superimposed dynamic loading forces.

Common forms of transducers involving force-responsive deformable elastic members equipped with electrical strain gages are well suited to the measurement of essentially static load forces, but unfortunately tend also to respond to accompanying dynamic forces which are not of interest, such as those stemming from environmental pulsations and vibrations. In addition, the electrical measurement networks into which such transducers are incorporated tend to be susceptible to induced interference or other electrical signal irregularities which evidence themselves in the outputs. All such effects are of course deleterious, in that they tend to obscure or at least introduce error into the intended measurements. Known prior practices aimed at overcoming such difficulties have included the use of conventional types of filters and the use of duplicate identical active strain gage bridges having their dynamic outputs coupled in a cancelling relationship. Each of these approaches is less than satisfactory in important respects; in the case of the filtered networks, for example, there is the difficulty that the frequencies and amplitudes of disturbances which may be encountered cannot be foretold with certainty, and that resort must be had to elaborate costly filtering, with attendant undesirable and unavoidable increase in instrument response times; and, in the case of duplicate or redundant active gaging, there is the expected complexity and expense associated with the provision and installation of well-matched active strain-gage bridges. In accordance with the present teachings, these problems are resolved through unique isolation and automatic detection and degenerative feedback of dynamic signals by way of a fast-response operational amplifier unit; the detection and feedback are achieved in a symmetrical strain gage transducer electrical network which removes troublesome electrical-circuit variables as a source of error.

Summary

By way of a summary account of underlying recognitions and of preferred practice of this invention in one of its aspects, advantage is found in the degenerative processing of dynamic components of electrical signals developed between symmetrically-disposed sites in an electrical strain gage transducer network involving but a single measurement bridge unit. Output terminals of the bridge unit are separately and symmetrically A-C coupled to a common network ground via voltage divider elements and D-C blocking capacitance, such that the voltages appearing between like divider taps can be made to represent only the relatively static signals which are to be indicated. Collaterally, the potentials across the bridge output terminals are applied as the input to an operational amplifier which continuously and automatically injects corresponding out-of-phase A-C voltages in series with the signals developed by one of the bridge output terminals. An associated output device in the form of a servo amplifier is fed with unidirectional transducer output signals from which the dynamic components have thus been excised, and from which so-called "common mode" variations have also been eliminated due to pre-established electrical symmetry of the transducer network. The servo amplifier in this instance excites a cooperating servo motor into appropriate actuations of a balancing impedance and measurement indicator.

Accordingly, it is one of the objects of the present invention to provide novel and improved strain gage transducer apparatus exhibiting precision and fast response times while remaining substantially immune to disturbing effects of dynamic forces which may be present in the force-measurement environment.

Another object is to provide force-transducer apparatus in which an uncomplicated measurement network involving but a single bridge unit is uniquely rendered insensitive to effects of spurious dynamic forces by degenerative action of an operational amplifier isolated from network voltage fluctuations as the result of electrical symmetry.

A further object is to provide a highly reliable, precise and economical strain-gage force transducer system which is symmetrical and uniquely self-corrected by an operational amplifier to eliminate indications of vibrations and other dynamic disturbances of measured force conditions over a wide range of frequencies and amplitudes without entailing sluggish responses.

Brief description of the drawing

In the drawing, which is partly in schematic and partly in block form, a strain-gage force transducer bridge is illustrated in a symmetrical network relationship with a power supply and servo-type rebalancing output arrangement, together with an operational amplifier degenerative-feedback circuit which is responsive to fluctuating signals.

Description of the preferred embodiment

A conventional force transducer 10, such as one involving a deformable elastic load column, beam, diaphragm, or the like (not shown) has its associated strain gage elements 10a–10d, connected together in an elementary Wheatstone bridge array wherein the input terminals 10e and 10f are supplied with D-C electrical excitation from a source 11 and the output terminals 10g and 10h are intended to exhibit D-C potentials differing by amounts accurately characterizing relatively steady-state or static loading forces experienced by the transducer. As is well known, such transducers may be responsive to forces related to a wide variety of factors, such as weight, torque, pressure, shear, and so forth, and the co-operating measurement gages may be in such forms as surface-bonded resistance-wire or single semiconductor members; although a simple full single bridge has been portrayed, as few as two of the bridge arms may be active gage elements, or, in some instances, each bridge arm may include a plurality of gage elements in parallel, or various series- and parallel-connected circuit elements may be involved for compensation or other special-purpose effects. Inherently, these transducers tend to produce output signals characterizing not only the static loading forces of measurement interest but also the rapidly pulsating, undulating or alternating dynamic forces present in the measurement environment because of such extraneous factors as vibration, shock, rotation, pulsations and mechanical motions. Consequently, output measurements which should represent simply the relatively static force conditions may instead be either partly obscured or entirely swamped by the unwanted response to dynamic disturbances.

Output apparatus 12 for the illustrated transducer system is exemplified by a servo rebalancing arrangement including a conventional form of servo amplifier 13 and cooperating servo motor 14, the latter being in driving relationship to both an output indicator 15 and the wiper lead 16a of a balancing potentiometer 16. To the extent that spurious dynamic conditions influence the electrical signals witnessed across the servo input leads 16a and 17, both the wiper lead and output indicator 15 will fluctuate and thus relate erroneously to the true static-force indication. Response times should not be large, however, because the effectively high damping would then prevent the system from evidencing properly the forces, sometimes variable, which are undergoing measurement.

In accordance with principles noted earlier herein, degenerative processing and suppression of unwanted dynamic signals in the system is achieved by way of operational amplifier circuitry 18, the input leads 19 and 20 of which apply to amplifier 21 potentials of difference and sense characterizing the instantaneous values and polarities of these disturbances. These potentials are tapped from the transducer output terminals 10g and 10h, and amplifier 21 responds advantageously by developing the usual opposite-polarity output voltage across its output leads 22 and 23. The amplifier gain yields output amplitudes which are appropriate to production of signals which will substantially cancel the unwanted A-C signals when placed in series opposition to them, and the latter cancelling relationship is established by adding the amplifier output to that of the transducer through a D-C blocking capacitance 24 and voltage divider resistance elements 25 and 26, all of which are in series between the transducer output terminal 10h and a system ground 27. Without more, the intended compensation is unfortunately susceptible to undesirable influences of other spurious system spurious system signals, such as induced signals, which also can be exhibited in both of the output lines from the transducer; however, effects of these so-called "common mode" voltages are suppressed by establishing a circuit symmetry through use of a like D-C blocking capacitance 28 and like voltage divider resistance elements 29 and 30 in series between the other transducer output terminal, 10g, and the system ground 27. Output taps 17a and 31a in the two voltage-divider legs thus do not deliver to the respective output leads 17 and 31 signals whose differences can represent these common-mode voltages, and, moreover, the voltages at tap 31a and in lead 31 at all times have the unwanted dynamic components subtracted from them by action of the operational amplifier arrangement. What remains between the output leads 17 and 31 is then only the substantially D-C signals appearing in the transducer output as the result of bridge unbalance conditions directly characterizing the measured loading forces. These signals are slaved in relation to the D-C source 32 as the result of the lead 17 being center-tapped, at 33, between supply divider resistances 34 and 35, and as the result of the illustrated known balanced feed of lead 31 into the supply divider network 36 including the balancing potentiometer 16. A further center tapping, 37, between supply divider resistances 38 and 39, slaves the transducer power supply with the aforementioned ground 27, and a like grounding of center-voltage lead 40 for the operational amplifier power supply 41 insures that common mode voltages will be minimized.

Operational amplifier 21 includes the usual input resistances, 42 and 43, and feedback resistances, 44 and 45; in addition an adjustable gain-control resistance 46 is provided so that the gain may be set accurately for purposes of precise compensation despite departures of power supply voltage from the intended value. Power supply 41 is selected to exhibit a highly stable output, such as can be expected with good line regulation, to prevent transients from causing related transients in the outputs produced by indicator 15. The operational amplifier is, of course, a stabilized D-C feedback amplifier utilizing high-gain forms of circuitry and resistive coupling which promotes desirable high-frequency characteristics; input impedance is very high, such that the transducer output is not significantly loaded by the amplifier.

It should be understood that the specific preferred embodiment and practices which have been depicted and described herein have been presented by way of disclosure rather than limitation, and that those skilled in the art will appreciate that various modifications, combinations and substitutions may be effected without departure from the spirit and scope of this invention in its broader aspects and as set forth in the accompanying claims.

What I claim as new and desire to secure by Letters Patent of the United States is:

1. Force measurement apparatus comprising a force-responsive transducer including strain gages in a circuit having output terminals exhibiting electrical output signals characterizing both substantially static and relatively dynamic forces to which the transducer is exposed, stabilized electrical amplifier means having relatively high input impedance, means applying signals appearing across said terminals as input to said amplifier means, separate and substantially identical voltage-dividing impedance means each connected between a different one of said output terminals and an electrical ground, means applying dynamic components of the electrical output of said amplifier means in opposing cancelling relationship to those dynamic components of electrical output of said transducer circuit which characterize said dynamic forces and which appear in one of said voltage-dividing impedance means, and output means characterizing the electrical output signals appearing between corresponding points in said voltage-dividing impedance means, whereby said output signals represent substantially only the static forces to which the transducer is exposed.

2. Force measurement apparatus as set forth in claim 1 wherein each of said impedance means includes a voltage-divider resistance connected with a different one of said output terminals and a D-C blocking capacitance connected between said resistance and said ground, and wherein said means applying dynamic components of said amplifier output connects said amplifier output in opposing cancelling relationship to those dynamic components of said electrical output characterizing said dynamic forces across at least part of said resistance between one of said output terminals and said ground.

3. Force measurement apparatus as set forth in claim 2 wherein said means applying dynamic components of said amplifier output connects said amplifier output serially between said ground and the D-C blocking capacitance connected between one of said terminals and said ground.

4. Force measurement apparatus as set forth in claim 1 wherein said amplifier means comprises an operational amplifier producing A-C electrical output signals of polarity reversed in relation to the input thereto and of substantially the same amplitudes as said input, wherein said amplifier further includes a D-C power supply, means slaving the center voltage of said power supply to said ground, a D-C transducer power supply connected across the input terminals to said transducer circuit, and means slaving the center voltage of said transducer power supply to said ground.

References Cited

UNITED STATES PATENTS

| 2,236,134 | 3/1941 | Gloess | 328—165 XR |
| 2,873,107 | 2/1959 | Lyons | 177—211 |
| 2,929,027 | 3/1960 | Cooke | 328—265 XR |
| 3,368,637 | 2/1968 | Green et al. | 177—211 |

CHARLES A. RUEHL, *Primary Examiner.*

U.S. Cl. X.R.

73—88.5; 177—211